United States Patent [19]
Eischeid

[11] Patent Number: 4,768,599
[45] Date of Patent: Sep. 6, 1988

[54] DRILL BIT FOR UNDERCUTTING A BLIND BORE

[76] Inventor: Karl Eischeid, Schulweg 23, D-5250 Engelskirchen, Fed. Rep. of Germany

[21] Appl. No.: 38,191

[22] Filed: Apr. 14, 1987

[30] Foreign Application Priority Data

Apr. 15, 1986 [DE] Fed. Rep. of Germany ....... 3612648
Jun. 18, 1986 [DE] Fed. Rep. of Germany ....... 3620389
Dec. 3, 1986 [DE] Fed. Rep. of Germany ....... 3641262

[51] Int. Cl.[4] ........................... E21B 7/08; E21B 7/28
[52] U.S. Cl. ....................................... 175/79; 175/80; 175/263; 175/399
[58] Field of Search ........................ 175/73, 78, 79, 80, 175/263, 284, 292, 398, 399, 408, 406; 166/117.5

[56] References Cited

U.S. PATENT DOCUMENTS

| | | | |
|---|---|---|---|
| 141,344 | 7/1873 | Gillespie | 175/399 |
| 1,138,332 | 5/1915 | Underwood | 175/406 |
| 1,207,119 | 12/1916 | Young | 175/399 |
| 2,638,327 | 5/1953 | Baldwin | 175/406 |
| 4,635,737 | 1/1987 | Miyanaga | 175/284 |
| 4,640,371 | 2/1987 | Moraly | 175/73 |

Primary Examiner—Jerome Massie, IV
Assistant Examiner—Bruce M. Kisliuk
Attorney, Agent, or Firm—Herbert Dubno; Andrew Wilford

[57] ABSTRACT

A bit assembly for undercutting a blind bore extending along a bore axis between an open outer end and a closed inner end and having a substantially cylindrical wall of a predetermned diameter centered on the bore axis and extending between the ends comprises a pusher body normally seated in the closed inner end of the bore and having an outwardly turned camming surface inclined to the bore axis, and a bit having a shaft extending along a longitudinal bit axis and having an inner end, an outer end, and a pair of longitudinally extending sides terminating at the inner end. One of the sides is at least partially cylindrical and centered on the bit axis and the inner end is formed with a camming surface engageable with the camming surface of the body and inclined to the bit axis. A blade fixed permanently and stationarily on the inner end projects radially from the one side of the shaft, the other side being cut back toward the bit axis.

17 Claims, 10 Drawing Sheets

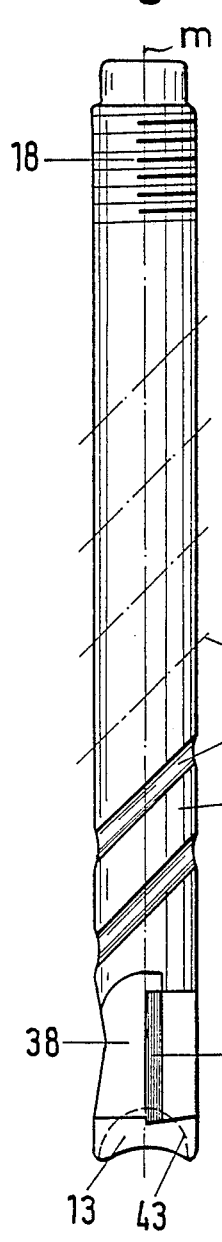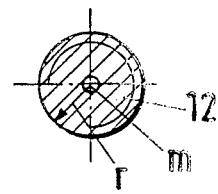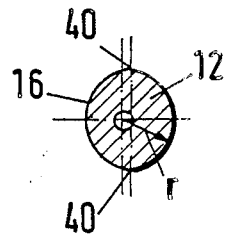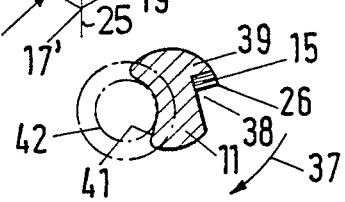

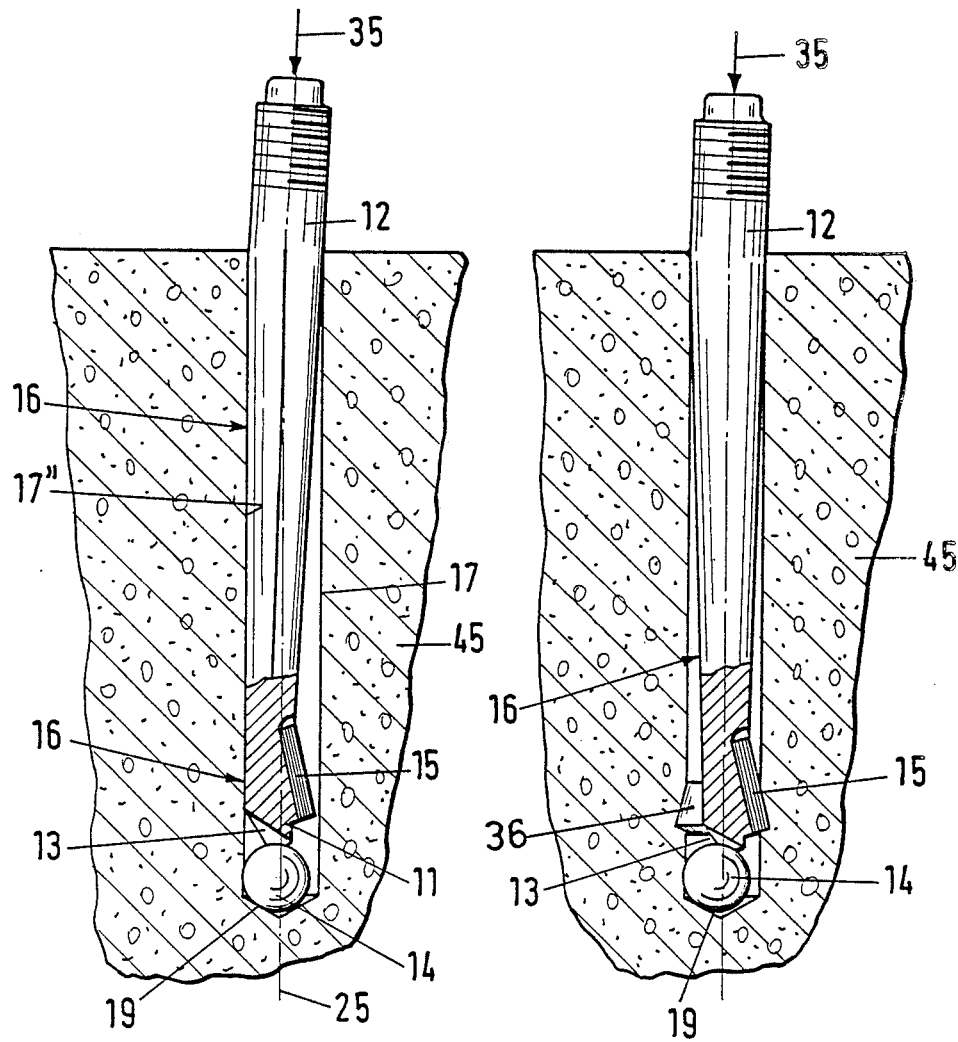

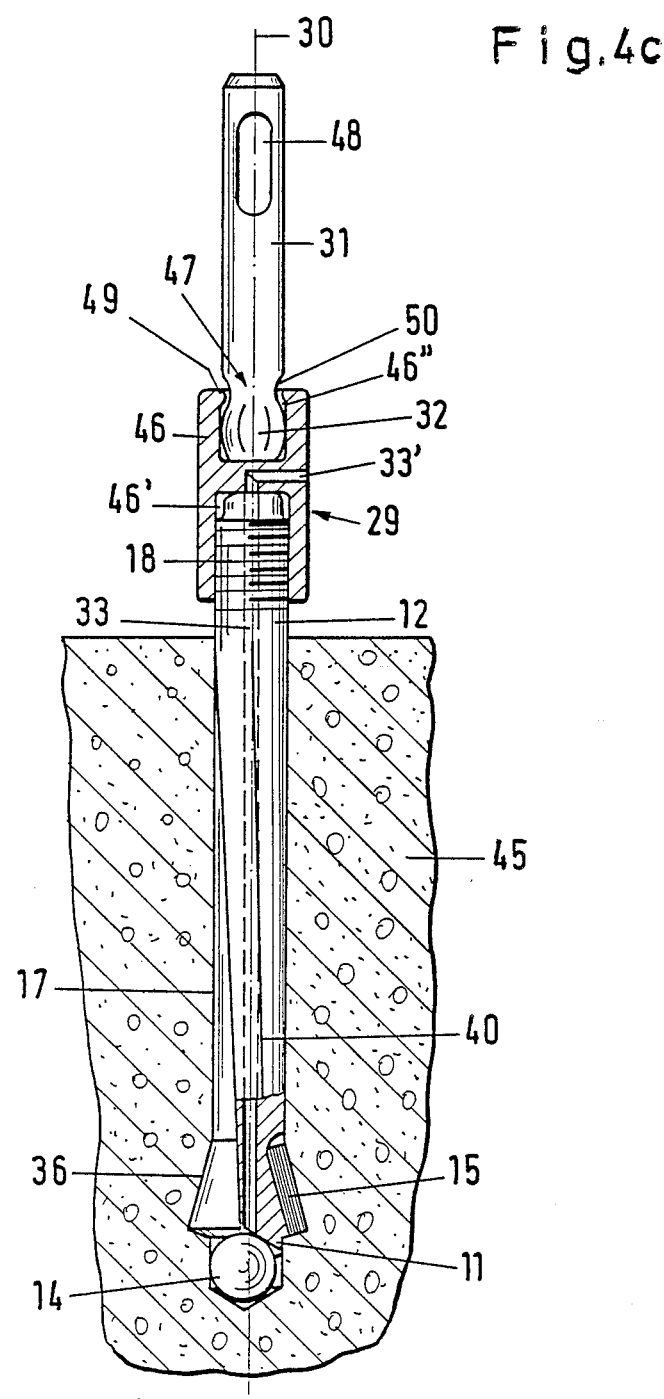

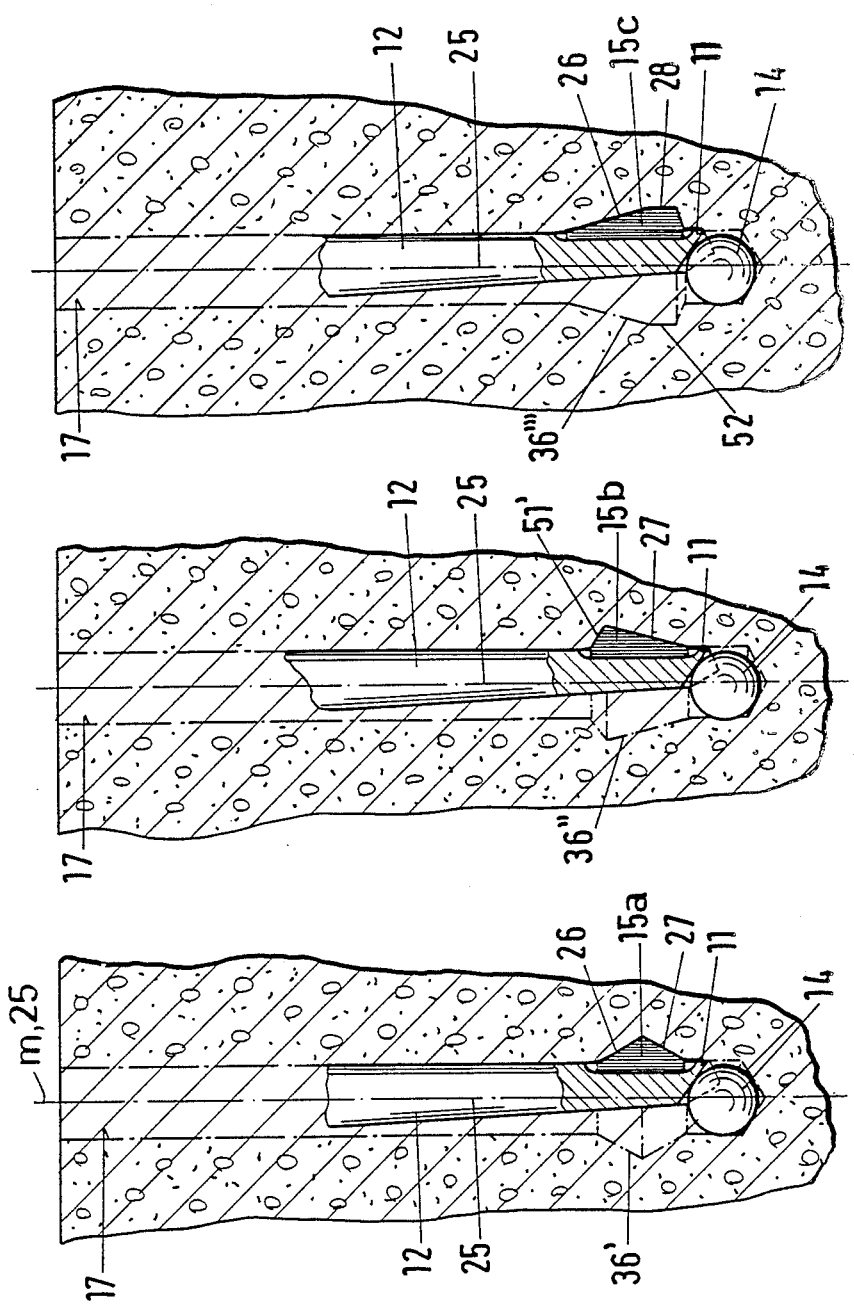

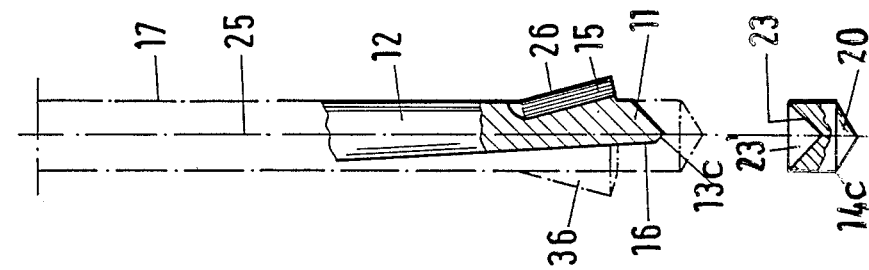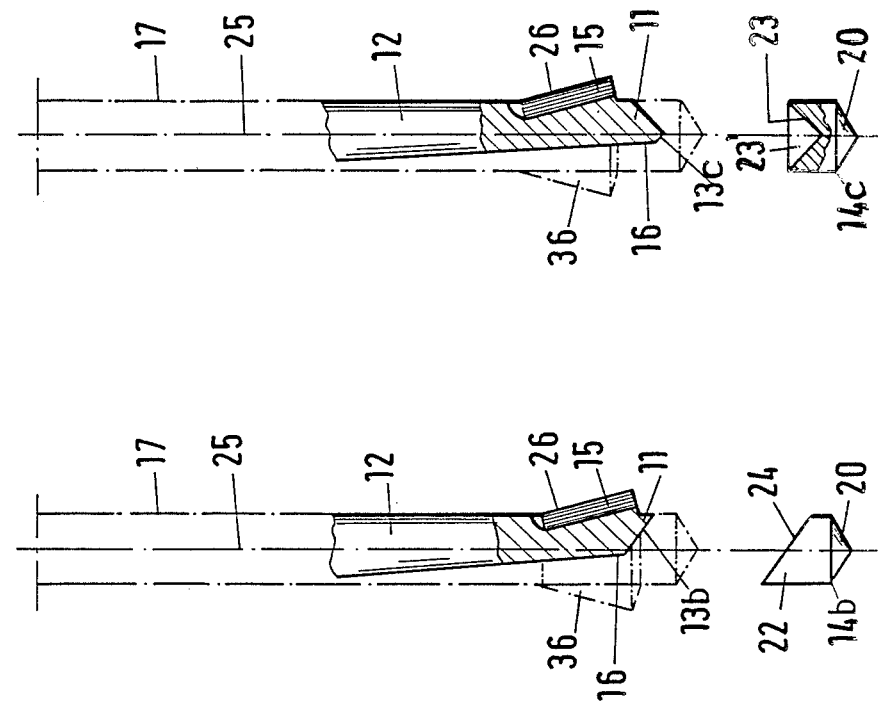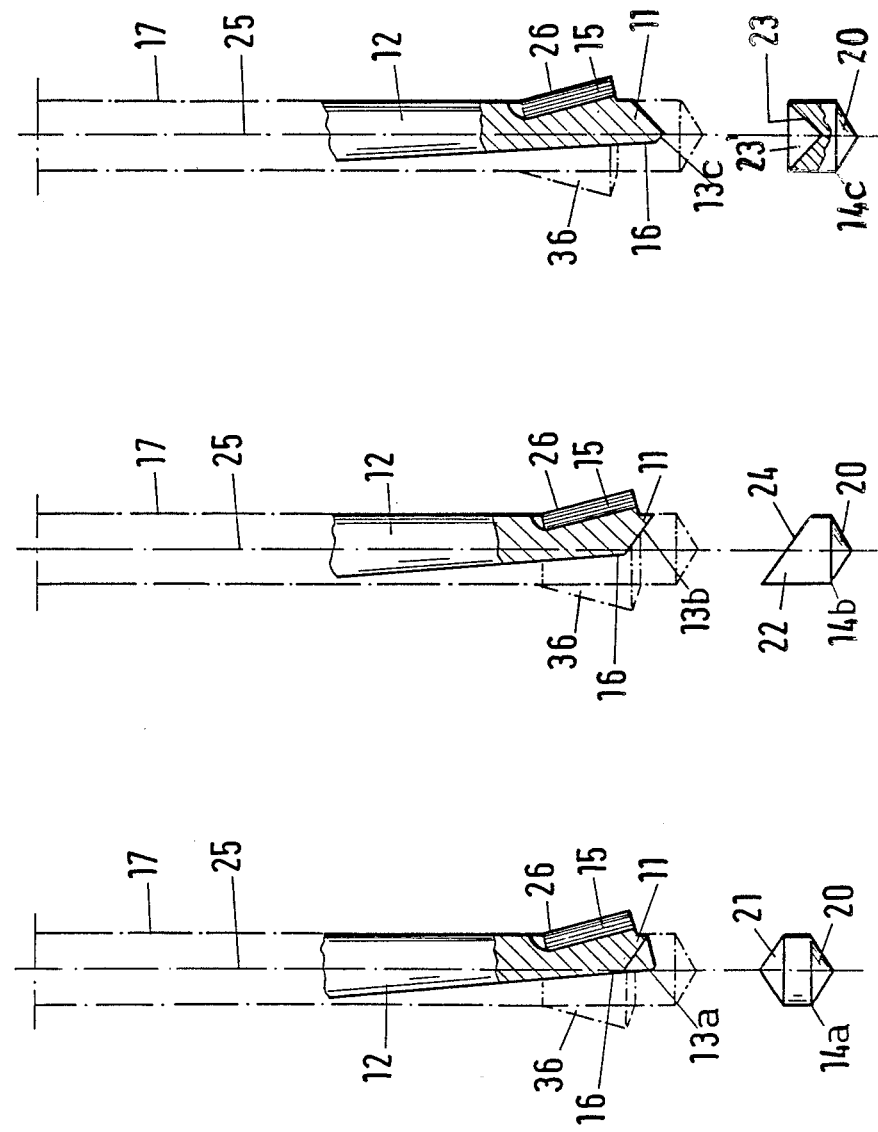

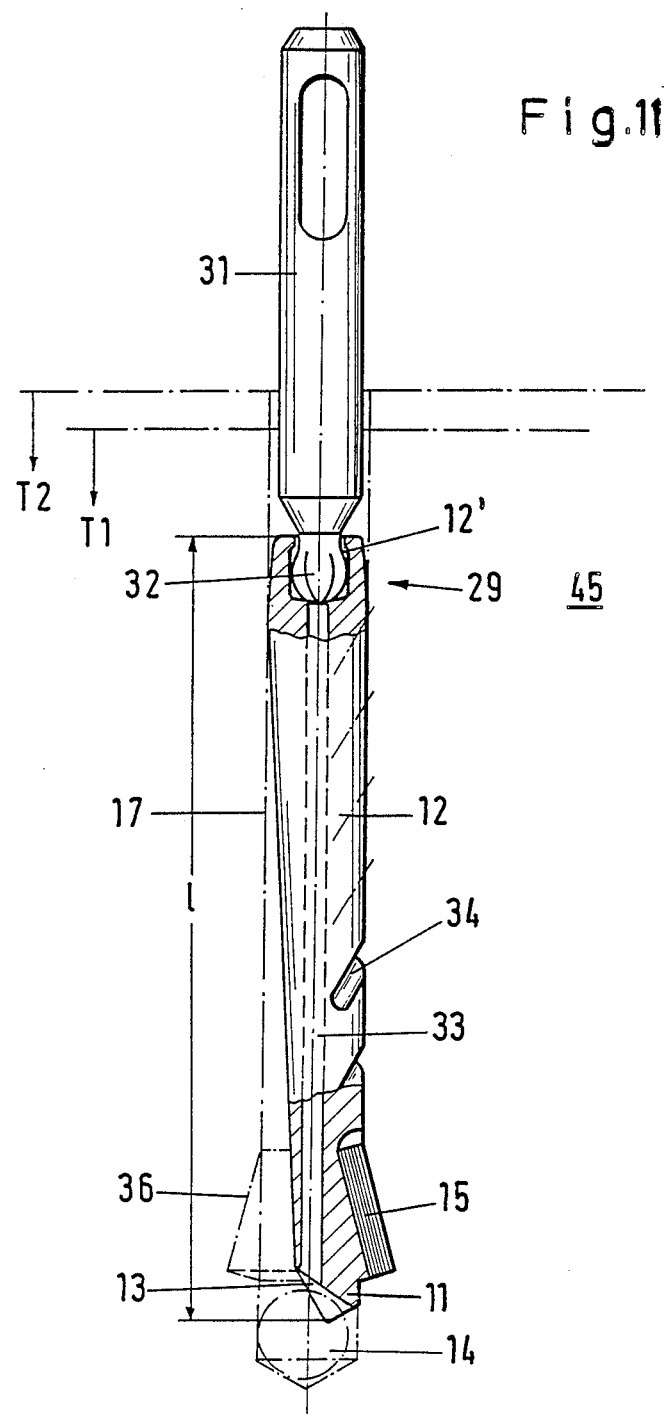

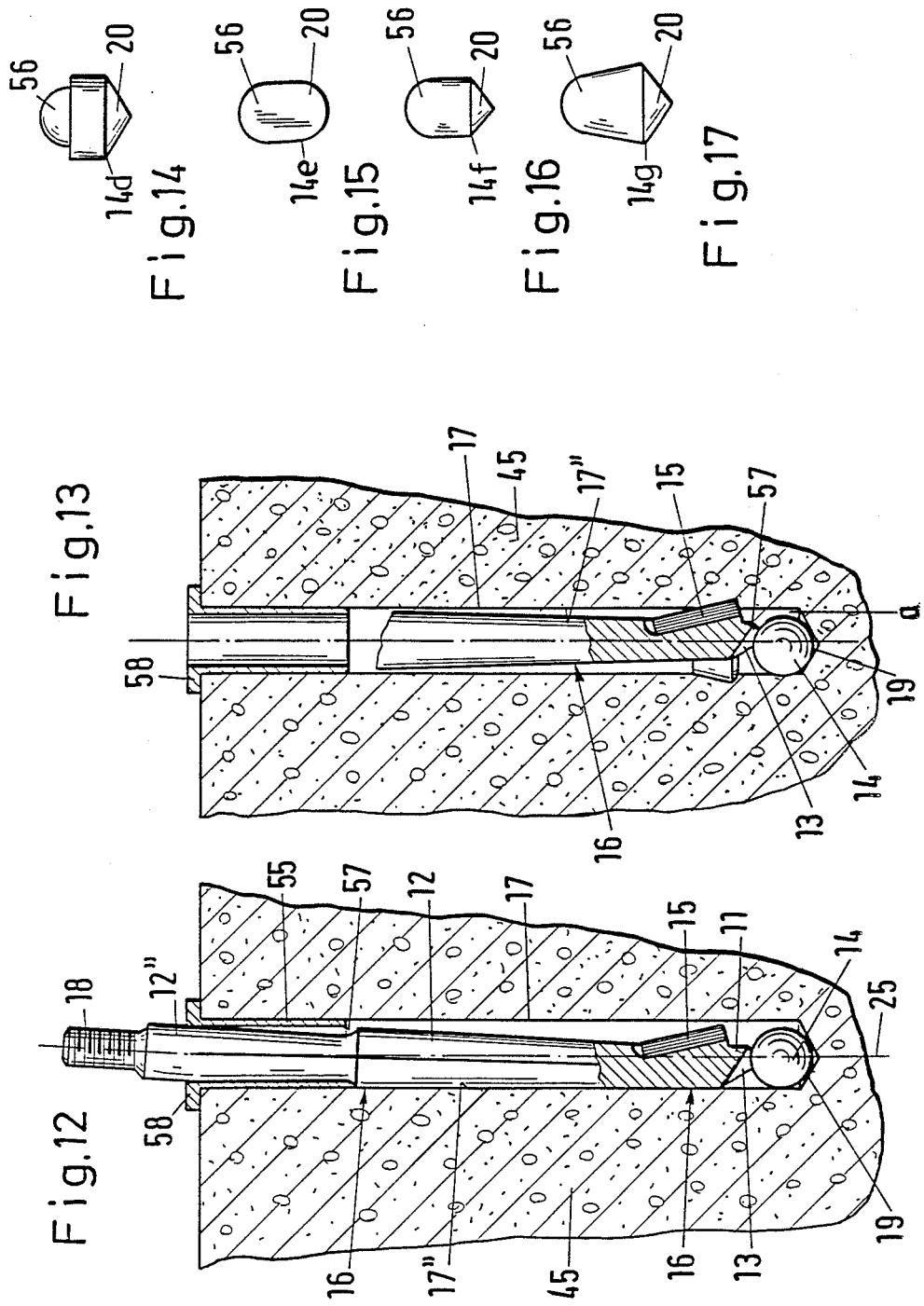

Fig.18
Fig.19
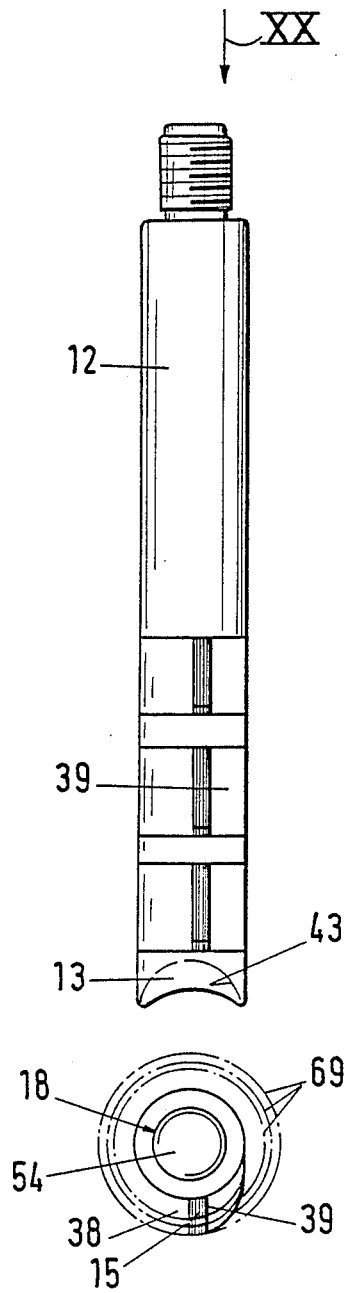
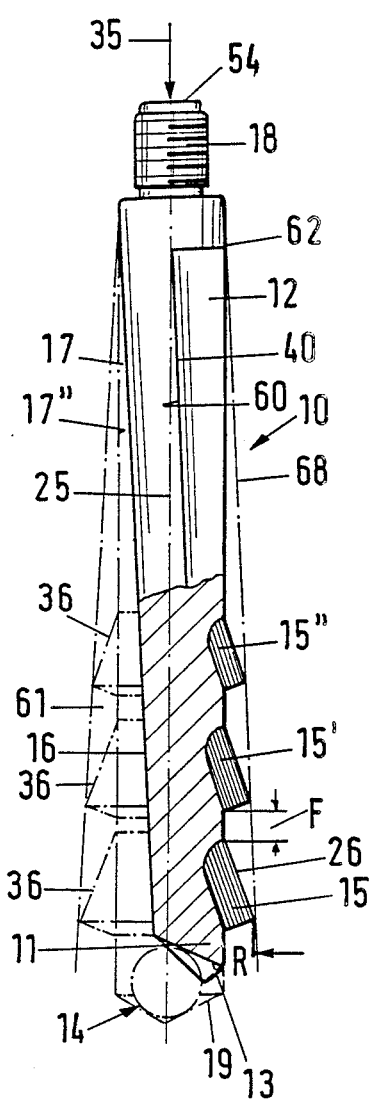
Fig.20

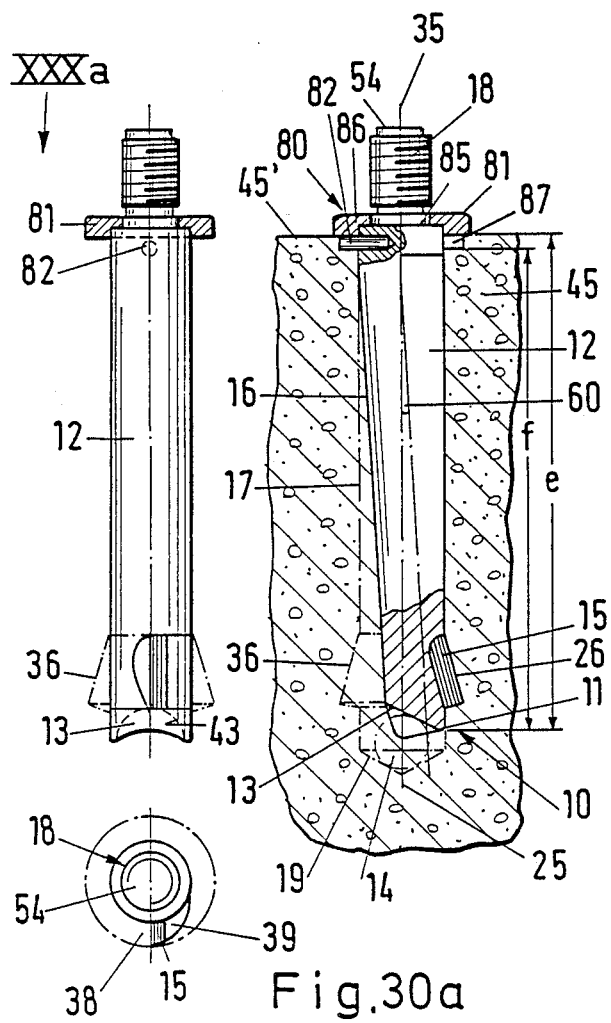

DRILL BIT FOR UNDERCUTTING A BLIND BORE

FIELD OF THE INVENTION

The present invention relates to a drill-bit assembly for undercutting a blind bore. More particularly this invention concerns such a bit used to widen the blind end of a bore in rock for securing a rock bolt or the like in place.

BACKGROUND OF THE INVENTION

In order to maximize the hold of a rock bolt or the like in a blind bore, it is known to widen the blind inner end of such a bore with a special tool after it has been drilled out by the conventional bit that leaves behind a bore having a cylindrical wall. Such a bit basically comprises a shaft having a tip from which an undercutting blade projects laterally.

In East German Pat. No. 236,487 the tip end of the shaft is bifurcated and traversed by a pivot pin. The undercutting blade is pivotal on this pin between a position projecting laterally from the tip of the bit and a position recessed within the tip and wholly within the outlines thereof. A ball or other pusher body is dropped into the blind bore after it is drilled but before it is undercut, and the pivotal blade has a formation that engages this ball and pushes the blade laterally outward so that it can undercut the bore when the bit is rotated. Thus as the bit is pushed axially of the bore and longitudinally of the bit into the hole the blade is cammed laterally out so that rotation of the bit undercuts the bore adjacent its inner end.

The main problem with such a tool is that the undercutting blade is fairly weak. Thus the danger of breaking it is fairly great, in particular as such a bit is typically used in rock which is a substance whose hardness is considerable and varying. Furthermore this multipart structure is fairly expensive to produce, so that a bit provided with such moving parts is fairly expensive.

OBJECTS OF THE INVENTION

It is therefore an object of the present invention to provide an improved drill-bit assembly for undercutting a blind bore.

Another object is the provision of such a drill-bit assembly for undercutting a blind bore which overcomes the above-given disadvantages, that is which is of robust and simple construction.

SUMMARY OF THE INVENTION

A bit assembly for undercutting a blind bore extending along a bore axis between an open outer end and a closed inner end and having a substantially cylindrical wall of a predetermined diameter centered on the bore axis and extending between the ends comprises according to the invention a pusher body normally seated in the closed inner end of the bore and having an outwardly turned cammed surface inclined to the bore axis, and a bit having a shaft extending along a longitudinal bit axis and having an inner end, an outer end, and a pair of longitudinally extending sides terminating at the inner end. One of the sides is at least partially cylindrical and centered on the bit axis and the inner end is formed with a camming surface engageable with the camming surface of the body and inclined to the bit axis. A blade fixed permanently and stationarily on the inner end projects radially from the one side of the shaft, the other side being cut back toward the bit axis.

More particularly according to this invention both sides of the bit are part cylindrical. The blade side is centered on the bit axis and the opposite cut-back side is centered on a skew axis lying between the bit axis and the one side and intersecting the bit axis at the outer end. This skew axis in turn lies in a plane including the bit axis and the outermost point of the blade and is parallel to a line drawn in this plane from the outermost blade point to the surface of the one side at the outer end. Thus after the pusher body is in the hole, although it would be possible in a dense uniform workpiece material like metal or plastic to form the camming formation of the tip such that it would work directly on the floor of the bore, it is possible to slide the bit into the predrilled hole with the cut-back side riding on the inner wall of the hole. Once all the way in axial pressure causes the two camming formations to push the blade into the wall of the bore so that with rotation of the bit this blade will undercut the bore until the blade side comes to rest against the wall of the bore and the cut-back side is spaced inward in the bore, thereby limiting further penetration of the blade.

Since the carbide blade is permanently fixed, for instance by welding, to the tip of the bit, the entire assembly is extremely durable and inexpensive to manufacture. Use is extremely easy: first of all a cylindrical pilot hole of the desired depth is drilled, then the pusher body is fitted to it, then the undercutting bit of this invention is used to widen the base of the hole. Thereafter a rock bolt can be seated in an appropriate cement in the undercut hole for a very solid hold in the rock.

According to this invention the other side is cut back from the inner end all the way to the outer end. Normally both sides have substantially the same radius of curvature but the center of curvature of the cut-back other side is between the bit axis and the one side.

In accordance with another feature of this invention the camming surface of the pusher body is generally part spherical. Alternately the camming surface of the tip is cupped to receive the pusher body. They can also be substantially identically inclined to the respective axes.

One of the camming surfaces can be formed with an undercut formation and the other of the camming surfaces is formed with an inclined groove in which the formation is captured and guided. This formation can be a ridge or a mushroom-like raised ball. Either way the ends of the groove are closed and/or the ends of the ridge are widened to prevent the pusher from separating from the bit.

The shaft according to this invention is formed with a throughgoing passage extending from the outer end to the tip at the inner end. A source of gas under subatmospheric or superatmospheric pressure is connected to this passage at the outer end to blow out the hole or aspirate dust therefrom.

It is also within the scope of this invention to use a swivel joint connected to the outer end and having a shaft engageable in a chuck of a drill. This joint can be a separate element or built right into the bit.

For best hold and production of a stepped undercut bore, the inner end is provided with a plurality of generally axially aligned such blades. The blades have points all lying on an imaginary cylindrical surface centered on the bit axis and at least tangent to the other side diametrically opposite from the points. Thus the inner-most undercut groove will be the deepest one and the outermost groove the shallowest one. When such a plurality of blades is used they are distributed over at most 30° relative to the bit axis on the one side.

The pusher body according to the invention can comprise a hard core forming the respective camming surface and of a major dimension substantially smaller than a diameter of the bore and a soft fragile surround holding the core and of a major dimension substantially greater than the diameter of the bore. Thus the core can be wedged and held in place by forcing the surround into the bore. It is also possible to provide the outer shaft end with a device for marking a workpiece into which the drill bit is completely inserted. This serves to mark those holes that have been undercut, making the drilling and undercutting operations easier to keep track of.

DESCRIPTION OF THE INVENTION

The above and other features and advantages will become more readily apparent from the following, it being understood that any feature described with reference to one embodiment of the invention can be used where possible with any other embodiment. In the accompanying drawing:

FIGS. 1 and 2 are side views, taken 90° offset from each other, of the drill bit according to this invention;

FIGS. 3a, 3b, 3c, and 3d are sections taken respectively along lines IIIa—IIIa, IIIb—IIIb, IIIc—IIIc, and IIId—IIId of FIG. 1;

FIGS. 4a, 4b, and 4c are side views illustrating the bit of FIGS. 1 and 2 with its pusher body in a starting, an intermediate, and an end phase of undercutting a bore, the bit in FIG. 4c being illustrated with a swivel mount.

FIGS. 5, 6, and 7 correspond roughly to FIG. 4c but show the bit equipped with different side cutters;

FIGS. 8, 9, and 10 illustrate different tip formations and pusher bodies according to this invention;

FIG. 11 is a side view of another variant on the bit of FIGS. 1 and 2, with a permanently built in swivel;

FIGS. 12 and 13 illustrate use of the bit of this invention with an alignment collar;

Figure 21:
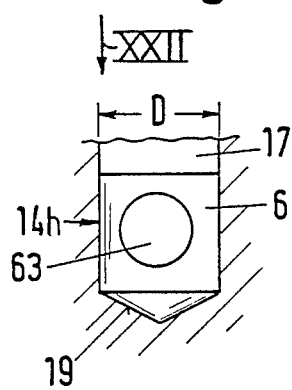
Figure 22:
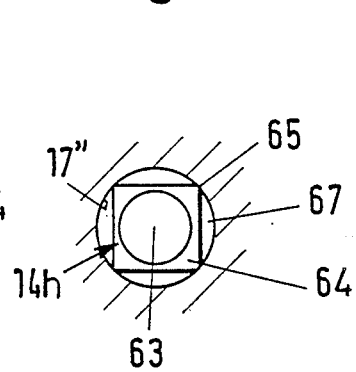
Figure 23:
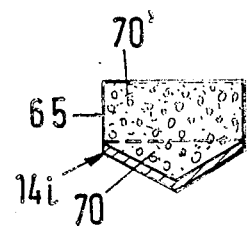
Figure 24:
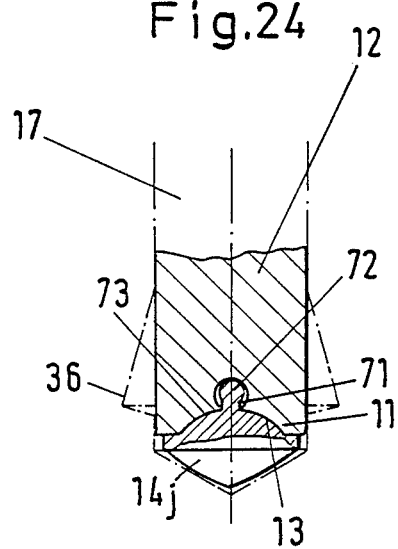
Figure 25:
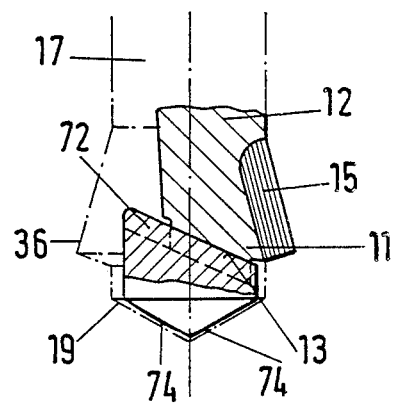
Figure 26:
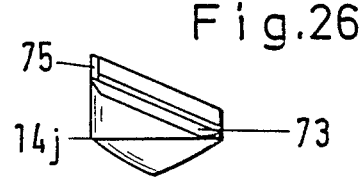
Figure 27:
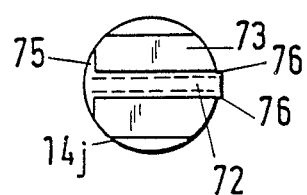
Figure 28:
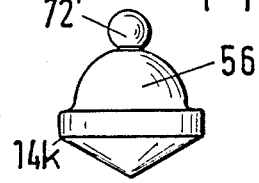

FIGS. 14, 15, 16, and 17 show different pusher bodies according to this invention;

FIGS. 18 and 19 are views like FIGS. 1 and 2 through another bit according to this invention;

FIG. 20 is a view taken in the direction of arrow XX of FIG. 18;

FIGS. 21 is a side view of a further pusher in accordance with this invention;

FIGS. 22 is a top view taken in the direction of arrow XXII of FIG. 21;

FIG. 23 is an axial section through yet another pusher in accordance with this invention;

FIGS. 24 and 25 are side sectional views taken along 90° offset planes of a tip of another bit according to this invention;

FIGS. 26 and 27 are side and top views of the pusher of FIGS. 24 and 26;

FIG. 28 is a side view of a further pusher in accordance with this invention;

FIGS. 29 and 30 are side views 90° offset from each other of another bit according to the invention;

FIG. 30a is an axial end view taken in the direction of arrow XXXa of FIG. 30;

FIG. 31a is a bottom view of a marker ring according to this invention;

FIGS. 31b and 31c are axial sections through two further marking rings; and

FIGS. 31d is an axial section through the ring of FIG. 31a.

SPECIFIC DESCRIPTION

As seen in FIGS. 1, 2, and 3a through 3d the drilling assembly according to this invention basically comprises a bit 10 having a shaft 12 extending along a longitudinal axis m and a pusher 14. The bit 10 has an inner tip 11 and an opposite chuck end 18 here shown threaded but which could also be grooved, faceted, or otherwise formed to fit in a drill chuck. The rear end surface 54 of the bit 10 is adapted to be struck axially as indicated by arrow 35 when used in a hammer drill.

FIG. 1 illustrates in dot-dash lines a cylindrical bore 17 to be undercut. This bore 17 is centered on an axis 25 and has a radius r. The bit 10 itself has a cylindrical rear end of substantially the same radius r as the bore 17 but its front end is provided with a laterally projecting blade 15 which as will be described below forms an undercut 36 in the bore 17 at the blind end 19 thereof. This blade 15 has a cutting edge 26 (FIG. 3d) and the shaft 12 is built up behind the blade 15 at 39. The shaft 12 is formed with a helical flute 34 that conducts chips back out of the hole 17.

According to the invention the side of the shaft 12 opposite the blade 15 is cut away at 16 to the same radius of curvature r as the bore 17. Thus this cutout 16 is a part-cylindrical surface merging at the rear end with the surface of the shaft 12, merging at line 40 with the cylindrical surface of the opposite side of the shaft 12, and spaced diametrically from the outermost point of the blade edge 26 by a distance equal to at most twice the radius r.

The tip 11 is formed with an inclined and concave camming surface 13 extending at between 40° and 70° to the axis m of the bit 10, here 65°, and inclined inward away from the axis m on the same side as the blade 15. Thus once the pusher ball 14 has been dropped into the bore 17 and has centered itself over the pointed end 17' of the blind end 19, pressure on the bit 10 in the direction 35 will cam the tip 11 laterally, pressing the blade 15 laterally and radially into the side of the bore 17.

The surface pressure between the inclined surface 13 and the ball 14 is minimized in that this surface 13 is fitted to the ball 14. More particularly as seen in FIG. 3d at 41 the surface 13 (FIG. 1) has the same radius r of curvature as the circle 42 where the parts actually of contact so that line contact is created between the tip 11 and the ball 14. Such fitting of the surface and the ball 14 is created also by the scooped-out shape indicated in dashed lines at 43 in FIG. 2.

More particularly as seen in FIG. 4a the bit 10 is pushed down into the hole with initially its cutout side 16 riding flat against the inner wall 17" of the bore 17, which here is shown drilled in rock 45. During such insertion the blade 15 will not quite contact the opposite side of the inner surface 17" while the cutout 16 will ride in surface contact down the opposite side of the surface 17".

Once all the way into the hole 17, the bit is pressed as shown by 35 against the ball 14, so that the surface 13 cams the blade 15 laterally. When the bit 10 is simultaneously rotated about the axis 25, this will cause the blade 15 to dig into the side wall 17" of the bore 17 adjacent the bottom 19. As the bit 10 is rotated the blade 15 then makes the undercut 36, with some motion inward as this cut 36 is made and the lower edge 51 of the blade 15 digs down into the rock 45.

Once the undercut 36 is of the same shape as the blade 15 seen from the side, the surface of the shaft 12 opposite the cutout 16 comes to lie in surface contact with the surface 17" of the bore 17. This effectively limits the depth of cut.

Clearly such a drilling operation has the axis 25 of the hole and the axis m of the bit 10 starting out in a noncoaxial relation. In order to prevent this misalignment from causing trouble for the power tool into which the end 18 is chucked, it is possible to use a swivel assembly 29 as shown in FIG. 4c. This unit has an H-section coupling body 46 formed with an inwardly open threaded seat 46' into which the rear end 18 of the bit 10 is threaded with its surface 54 bearing on the body 46. Opening axially oppositely is a six-sided recess 46" in which is received a six-facet coupling ball 32 of a shaft 31 extending along an axis 30 and formed with a groove 48 for engagement in a standard hammer-drill chuck. The upper end of the six-sided seat 46" is bent in at 49 to engage in a radially outwardly open groove 50 formed in the shaft 31 above its coupling ball 32. This therefore makes it possible for the operator to align the drive axis 30 of the tool with the axis 25 of the hole, so that the bit can move during the drilling operation with its axis m spiraling in to coincidence with the axis 31 and 25.

In the system of FIG. 11 the swivel 29 is constituted simply as the rod 31 and its ball head 32 received in a seat 12' formed at the rear end of the tool 10. This system allows the rod 31 to project into the hole 17 so that whether the hole is shallow such as indicated at T1 or deep as at T2 the swivel arrangement is usable. The rear end 18 of the bit 10 is invariably closely matched to the size of the bore 17, so that this arrangement allows even relatively deep bores to be undercut with relative ease as in effect the rear end of the bit 10 is centered in the bore 17. As shown in FIG. 11 a slight tapering of the rear end 18 above the center of the ball 32 is necessary to prevent the bit 10 from catching in the bore 17.

FIG. 11 as well as FIGS. 3a, 3b, 3c, and 4c illustrate a passage 33 extending through the bit 10 and opening axially forward at the axis m on the tip 11. In FIG. 4c the fitting 47 is formed with a lateral passage 33' for connection to the passage 33. This passage 33 is connected to the output side of a compressor or other source of pressurized gas when the bit 10 is formed with flutes 34 to blow chips and dust back out of the hole 17. When there is no such fluting 34 the passage 33 is connected to the suction side of the source to aspirate such chips and dust.

FIGS. 5 through 7 illustrate different blades for undercutting a bore 17. In FIG. 5 the blade 15a is shaped as an isosceles triangle with its base parallel to the axes m and 25 and its two sides 26 and 27 inclined thereto. Such a blade 15a cuts a triangular-section under cut 36' symmetrical to a plane perpendicular to the axes and 25.

The blade 15b of FIG. 6 has a short upper edge 51' and a long lower edge 27 to form a complementary undercut 36" in the bore 17. This undercut 36" acts when filled with an appropriate cement like a single buttress thread.

The blade 15c of FIG. 7 cuts an undercut 36'" with its long sloping upper edge 26 and a axis-parallel lower edge 28. This forms a cylindrical portion 52 in the cutout 36'" so that a subsequently set anchor can get a particularly good hold.

FIGS. 8 through 10 illustrate different pusher-tip configurations for camming out the drill tip 17. In FIG. 8 the pusher 14a has upper and lower conically pointed and coaxial ends 21 and 20. The lower point 20 sits in the point 17' of the bore 17 and the upper point 21 serves to cam the blade 15 radially outward. To this end the lower end 11 of the bit 10 is formed with a part-conical surface 13a that can sit complementary on the tip 21.

The pusher 14b of FIG. 9 has a conically pointed lower end 20 and an upper part 22 formed with a planar oblique camming surface 24. The lower end 11 of the bit 10 here is formed with an identically inclined planar surface 13b that can sit complementarily on the surface 24. Thus with this arrangement the pusher 14b will rotate in the hole 17 with the bit 10.

FIG. 10 shows a kinematic reversal of the system of FIG. 8, with a conical recess 23' forming a conical seat 23 in the pusher 14 and the tip 11 formed with a part-conical pointed surface 13c. The surfaces 23 and 13c are self-centering on the axis 25 of the bore 17 so that they will cam the blade 15 radially outward of the bore 17 and transversely of the tool 10.

FIGS. 14 through 17 illustrate four more pushers for camming out the drill tip 17. In FIG. 14 the pusher 14d has a lower point 20 but an upper part-spherical part 56. This pusher 14d therefore fits perfectly complementarily in the conically pointed floor 19 of the hole 17 and in the cylindrical region of the wall 17" above it and fits smoothly with a bit 10 of the type described with reference to FIGS. 1 and 2.

The pusher 14e of FIG. 15 is upwardly and downwardly rounded, having an intermediate cylindrical wall portion that is a tight fit in the bore 17.

The upper rounded portion 56 of the pusher 14f of FIG. 16 is of the same diameter as the cylindrical wall portion.

In the pusher 14g of FIG. 17 the outer wall tapers upward from the pointed end 20 to the rounded end 56.

FIGS. 12 and 13 show how the ball 14 can be slightly smaller than the bore 17, that is of smaller diameter, to leave a space a on the side where the blade 15 engages the wall 17". This ball 14 will therefore orbit around in the bore end 19 as drilling takes place, it therefore being impossible to get it stuck in the bore 17.

In addition FIGS. 12 and 13 illustrate an alignment collar 55 and a drill shank 12 having an upper portion 12" of slightly reduced diameter and meeting the lower portion formed with the flat 16 at a shoulder 57. The sleeve 55 has a rim 58 that sits on the face of the stone 45 and that holds the sleeve 55 up above the shoulder 57. The steel sleeve 55 serves as the fulcrum for the bit 10 and greatly reduces wear as opposed to running the bit shank against the abrasive rock 45. This also prevents unwanted widening of the bore 17 at its mouth.

In the arrangement of FIGS. 18, 19, and 20 the shaft 12 is provided in direct axial line with the blade 15 with two more such blades 15' and 15" that are separated by axial spacings F and that project by decreasing amounts R from the tip 11 back. The frontmost blade 15 is spaced wholly above the surface 13 so that during drilling the strain on the drill tip 11 and the brazing supporting the blade 15 in the shank 12 is minimized. The outermost points of the blades 15, 15', and 15" lie on a line 68 parallel to the diametrically opposite middle of the cutout 16. Thus the tool has at no location a diameter greater than that of the hole 17, measured perpendicular to the tool axis m. The three undercuts 36 leave two inwardly projecting ridges 61 in the rock so that anything cemented in place will have a very good axial hold. Dot-dash circle 69 in FIG. 20 illustrates the maximum extent of the lowermost cutout 36, indicating the excellent widening achieved with the system of this invention.

FIGS. 21 and 22 illustrate a pusher 14h that is a spherical ball 63 substantially smaller than the diameter D of the bore 7 but that is lodged in a cube 64 of a soft polystyrol foam of a diagonal dimension equal to slightly more than the diameter D. This makes it possible to insert the ball 63 into a downwardly open overhead bore 17. It will be wedged in place by the crushable foam cube 64 whose corners 65 will wedge into the side wall 17" while leaving voids 67. Once the bit 10 is inserted the cube 64 will be crushed, leaving the ball 63 loose, but this does not matter because once the bit 10 is in place it cannot fall out of the hole 17 anyhow. Once drilling is complete the ball 63 will automatically drop back out of the hole 17.

The pusher 14i shown in FIG. 23 is a conical sheet-metal cap filled with a styrol mass 70 extended by a styrol cylinder 70' of a diameter equal to that of the hole 17 or even slightly more. The sides 65 of this extension 70' ensure that the cap 14i will not become tipped in the hole 17 and, when the extension 70' is of somewhat greater diameter, it allows this part to hold in a downwardly opening overhead bore.

FIGS. 24 through 27 show a pusher 14j having an upwardly convex part-cylindrical and tipped camming surface 73 that fits with a complementary formation on the tip 11. In addition the tip 11 is formed parallel with its surface 13 with a groove 71 into which fits a bead 72 on the surface 73. The width of the groove 71 where it meets the surface 13 is smaller than the diameter of he bead 72 so that the pusher 14j holds on the end of the bit 10 and can be inserted and extracted with this bit 10.

This pusher 14j is a permanent attachment to the bit 10 and in fact is formed either as a fine casting or a forged piece. It has some play as illustrated in dashed lines in 24 so that the dust created by drilling does not jam it. In addition this ensures that the ridge 72 will not be used for rotary force transmission; instead the interfit of the surface 13 with the part-cylindrical skew surface 73 will transmit all torque.

At one end the ridge 72 is extended at 76 as shown in FIG. 27 and at the other end it is extended laterally to prevent its sliding off the bit 10. To permanently mount the pusher 14j on the bit the projecting end 76 is flattened somewhat like a rivet, thereby making it impossible for the bit to slide as seen in FIG. 25 off the pusher 14j to the right.

FIG. 28 shows another pusher 14k substantially identical to that of FIG. 14, but having a ball top 72'. This system works like that of FIGS. 24 through 27. The ball 72' can be captured in the groove 71 by closing its ends, for example by hammering them in. The outer diameter of the pusher 14k is somewhat smaller than the diameter D of the pilot bore 17.

As seen in FIGS. 29, 30, and 30a the upper end of the shaft 12 can be fitted with a marking device 80 comprised of a washer 81 and a blade 82 formed as a pin. The washer 81 projects radially from the shaft 12 past the end of the pin 82 which itself is force-fitted in a hole in the shaft 12. The washer 81 sits atop a shoulder 85 of the shaft 12 directly on the pin 82. FIG. 29 shows how the distance f from the marking device 80 to the tip 10 of the bit 10 is smaller than the insertion distance e of the shaft 12 in the hole 17.

FIGS. 31a and 31d illustrate a washer 31 having diametrically opposite cutter teeth 83. These teeth 83 are brazed in place and serve to score the workpiece when the desired depth is reached. It is possible as seen in FIGS. 31b and 31c to use a single tooth 83, either of radially elongated section or of triangular section. The two-tooth system of FIGS. 31a and 31d has teeth of different axial height so that first the outer one scores the stone 45 and then the inner one, giving a very accurate measure of depth of the hole 17.

The marker 80 provides around the mouth of each hole a visible indication that it has been undercut. Holes with a ring around them cut by the teeth 83 are the undercut ones, making it easy for the drilling and undercutting operation to take place at separate times without losing track of which holes have been undercut.

I claim:

1. A bit assembly for undercutting a blind bore extending along a bore axis between an open outer end and a closed inner end and having a substantially cylindrical wall of a predetermined radius of curvature centered on the bore axis and extending between the ends, the assembly comprising:
   a pusher body normally seated in the closed inner end of the bore and having an outwardly turned camming surface inclined to the bore axis;
   a bit having a shaft extending along a longitudinal bit axis and having an inner end, an outer end, and a pair of longitudinally extending sides terminating at the inner end, one of the sides being at least partially cylindrical and centered on the bit axis, the inner end being formed with a camming surface engageable with the camming surface of the body and inclined to the bit axis, both sides having substantially the same radius of curvature with the center of curvature of the other side between the bit axis and the one side;
   a blade fixed permanently and stationarily on the inner end and projecting radially from the one side of the shaft, the other side being closer to the bit axis than the one side.

2. The bit assembly defined in claim 1 wherein the other side is inset radially from the inner end all the way to the outer end.

3. The bit assembly defined in claim 2 wherein both sides are of substantially of part-cylindrical shape.

4. The bit assembly defined in claim 1 wherein the camming surface of the pusher body is generally part spherical.

5. The bit assembly defined in claim 4 wherein the camming surface of the inner end is cupped to receive the pusher body.

6. The bit assembly defined in claim 1 wherein the camming surfaces are substantially identically inclined to the respective axes.

7. The bit assembly defined in claim 6 wherein one of the camming surfaces is formed with an undercut formation and the other of the camming surfaces is formed with an inclined groove in which the formation is captured and guided.

8. The bit assembly defined in claim 7 wherein the formation is a ridge.

9. The bit assembly defined in claim 8 wherein the formation is a ball.

10. The bit assembly defined in claim 1 wherein the shaft is formed with a throughgoing passage extending from the outer end to the inner end.

11. The bit assembly defined in claim 1, further comprising a swivel joint connected to the outer end and having a shaft engageable in a chuck of a drill.

12. The bit assembly defined in claim 1 wherein the inner end is provided with a plurality of generally axially aligned such blades.

13. The bit assembly defined in claim 12 wherein the blades have points all lying on an imaginary cylindrical surface centered on the bit axis and tangent to the other side at a location diametrically opposite from the points.

14. The bit assembly defined in claim 1 wherein the pusher body comprises
   a hard core forming the respective camming surface and of a major dimension substantially smaller than a diameter of the bore, and
   a soft fragile surround holding the core and of a major dimension substantially greater than the diameter of the bore, whereby the core can be wedged and held in place by forcing the surround into the bore.

15. The bit assembly defined in claim 1, further comprising
   means on the outer shaft end for marking a workpiece into which the drill bit is completely inserted.

16. The bit assembly defined in claim 1 wherein the camming surface of the pusher body is outwardly axially convex and the camming surface of the tip is inwardly axially concave.

17. A bit assembly for undercutting a blind bore extending along a bore axis between an open outer end and a closed inner end and having a substantially cylindrical wall of a predetermined radius of curvature centered on the bore axis and extending between the ends, the assembly comprising:
   a pusher body normally seated in the closed inner end of the bore and having an outwardly turned camming surface inclined to the bore axis;
   a bit having a shaft extending along a longitudinal bit axis and having an inner end, an outer end of generally the same radius of curvature as the bore, and a pair of longitudinally extending part-cylindrical sides terminating at the inner end and both of substantially the same radius of curvature as the bore, one of the sides being centered on the bit axis and the other side being centered on a skew axis lying between the bit axis and the one side and intersecting the bit axis at the outer end, the inner end being formed with a camming surface engageable with the camming surface of the body and inclined to the bit axis; and
   a blade fixed permanently and stationarily on the inner end and projecting radially from the one side of the shaft, the other side being closer to the bit axis than the one side.

* * * * *